United States Patent

Chen

[11] Patent Number: 5,943,946
[45] Date of Patent: Aug. 31, 1999

[54] INFUSING DEVICE FOR A BEVERAGE

[76] Inventor: Uei-Tsai Chen, No. 10, Sec. 3, Yuan-Lu Rd., Hsiang, Pu-Yen Chang-Hua Hsien, Taiwan

[21] Appl. No.: 09/161,518

[22] Filed: Sep. 29, 1998

[51] Int. Cl.[6] .................................................. A47J 31/18
[52] U.S. Cl. .................................. 99/297; 99/323; 99/316
[58] Field of Search .......................... 99/297, 287, 302 P, 99/323, 316, 322

[56] References Cited

U.S. PATENT DOCUMENTS 1,701,194   2/1929   Rosenstein et al. .................. 99/297 X

FOREIGN PATENT DOCUMENTS 801609   9/1958   United Kingdom ..................... 99/297

*Primary Examiner*—Reginald L. Alexander
*Attorney, Agent, or Firm*—Baker & Botts, LLP

[57] ABSTRACT

An infusing device includes an infusing container with an annular wall that extends in an axial direction, and a bottom wall that defines an outlet therein for discharging a beverage. A filtering member is inserted in the infusing container with a major surface transverse to the axial direction. The filtering member has a center area and a perforated portion for passage of the beverage. A stem is fixed at the center area and extends outwardly of the mouth for gripping by a user's hand. A plug member is disposed underneath the filtering member to register with the outlet. When the filtering member moves with the stem in the axial direction, the plug member will engage and be disengaged from the outlet so as to close and open the outlet, respectively.

3 Claims, 5 Drawing Sheets

INFUSING DEVICE FOR A BEVERAGE

BACKGROUND OF THE INVENTION

1. Field of the Invention

This invention relates to an infusing device for a beverage, more particularly to a tea infusing device adapted to discharge the beverage into a drinking vessel disposed thereunder.

2. Description of the Related Art

Referring to FIG. 1, a conventional tea infusing vessel is shown to include an infusing body 1 with a filter 2 received movably in an accommodating space 101 thereof. A connecting rod 3 has a lower end connected to the filter 2, and an upper end extending upwardly through a lid 4 which rests on an open top of the infusing body 1. When hot water is poured into the infusing body 1, tea leaves placed in the space 101 can be infused for preparing a beverage. Then, the filter 2 can be moved downward by pressing the connecting rod 3 to press the infused tea leaves toward the bottom of the space 101, thereby preventing the tea leaves from flowing out from a lip of the infusing body 1.

Once the tea leaves are immersed in the water for a relatively long amount of time, the taste of the beverage might be too strong for the user. Thus, the beverage must be poured out of the infusing device into an additional vessel, thereby resulting in inconvenience during use. The tea leaves which have been pressed are unsuitable for use when preparing another glass of tea. In addition, it is difficult to remove the tea leaves from the bottom of the vessel body 1.

Another conventional infusing vessel has a tea infusing device in the form of a strainer to be disposed on the open top of the vessel. Hot water can be poured into the vessel via the infusing device for infusing tea leaves. It is noted that the tea drink prepared using the conventional infusing vessel in the strainer has a relatively weak taste since the flavor of the tea leaves is not sufficiently infused into the hot water.

SUMMARY OF THE INVENTION

The object of the present invention is to provide an infusing device which can discharge a beverage into a drinking vessel disposed thereunder, and which can retain the flavoring material in a loose state during use of the infusing device.

According to this invention, an infusing device includes an infusing container which has an annular wall with a lower annular end and an upper annular end defining a mouth that opens upwards in an axial direction, and a bottom wall extending inwardly and radially from the lower annular end to define an outlet therein for discharging a beverage. A filtering member is inserted in the infusing container with a major surface transverse to the axial direction. The filtering member has a center area where an axis along the axial direction passes, and a perforated portion disposed offset from the center area to permit the beverage to pass therethrough. A stem is fixed at the center area and extends outwardly of the mouth for gripping by a user's hand. A plug member is disposed underneath the filtering member and is registered with the outlet. As such, when the filtering member moves with the stem in the axial direction, the plug member will engage and be disengaged from the outlet so as to close and open the outlet, respectively.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
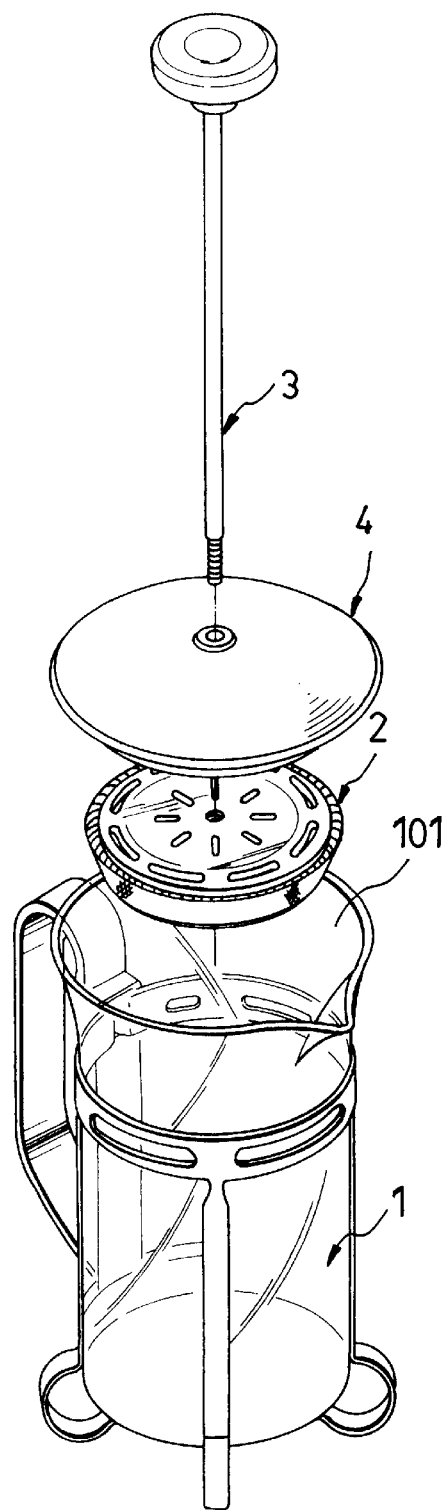
FIG. 1 is an exploded view of a conventional tea infusing device.

Before the present invention is described in greater detail, it should be noted that same reference numerals have been used to denote like elements throughout the specification.

Figure 2:
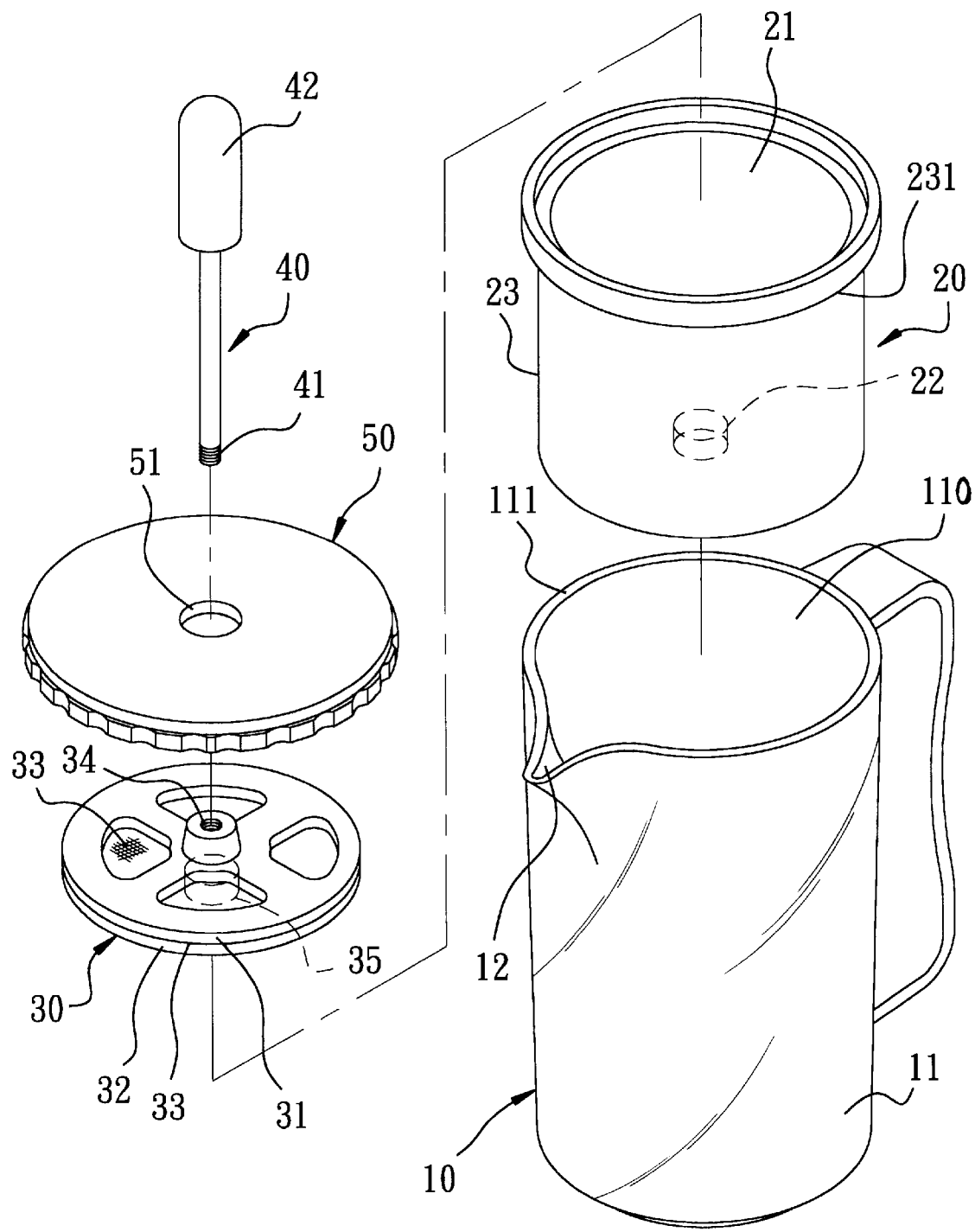
FIG. 2 is an exploded view of a first preferred embodiment of an infusing device according to this invention.
Figure 3:
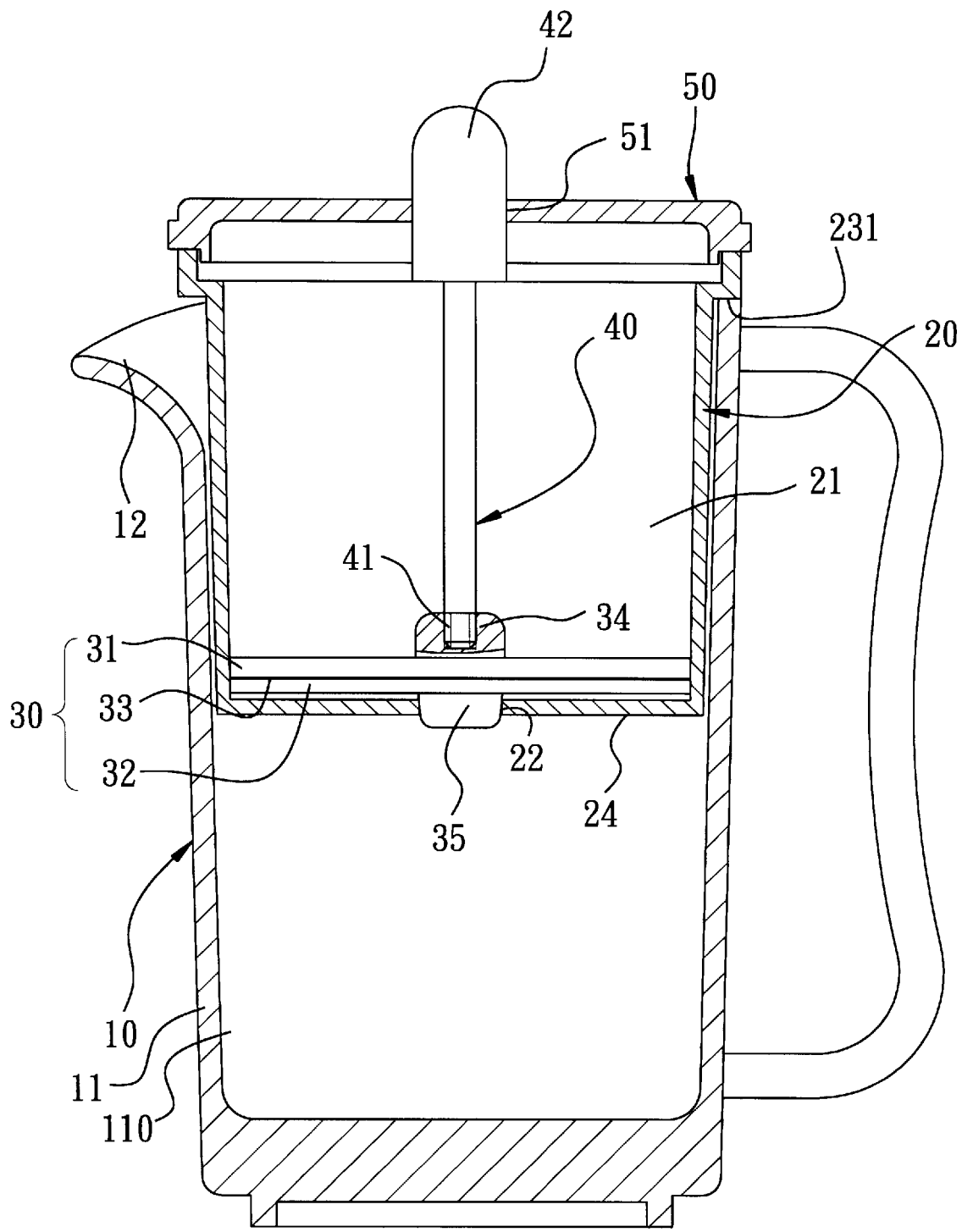
FIG. 3 is a sectional view of the infusing device of the first preferred embodiment.

Referring to FIGS. 2 and 3, the first preferred embodiment of an infusing device according to the present invention is shown to comprise a drinking vessel 10, an infusing container 20 which is disposed in the drinking vessel 10, a filtering member 30 which is inserted into the infusing container 20, a stem 40, and a lid 50.

The drinking vessel 10 is in the form of a jug, and has a cylindrical wall 11 which is provided with an upper rim 111 with a lip 12.

The infusing container 20 is made of a heat-resistant material, and has an annular wall 23 with a height that is half of that of the cylindrical wall 11. The annular wall 23 includes a lower annular end and an upper annular end which has a mouth that opens upward in an axial direction and a flange that extends outwardly and radially to confine an annular shoulder 231 for resting on the upper rim 111. A bottom wall 24 extends inwardly and radially from the lower annular end and has an outlet 22 formed therein.

The filtering member 30 includes a perforated upper plate 31, a perforated lower plate 32, and a strainer 33 superimposed therebetween, and is insertable in the infusing container 20 with a major surface transverse to the axial direction. The filtering member 30 has a center area with a screw hole 34 which extends along the axial direction, and a perforated portion which is disposed offset from the center area. A plug member 35 is disposed integrally and downwardly from the lower plate 32 underneath the center area, and converges downwardly for registering with the outlet 22.

The stem 40 has a lower portion formed with a screw thread 41 for threaded engagement with the screw hole 34, and an enlarged upper grip portion 42 which extends outwardly of the mouth of the infusing container 20 for gripping by the user's hand.

The lid 50 has a peripheral portion to abut against the flange of the infusing container 20, and a center hole 51 for passage of the upper portion of the stem 40 to cover the mouth of the infusing container 20.

Figure 4:
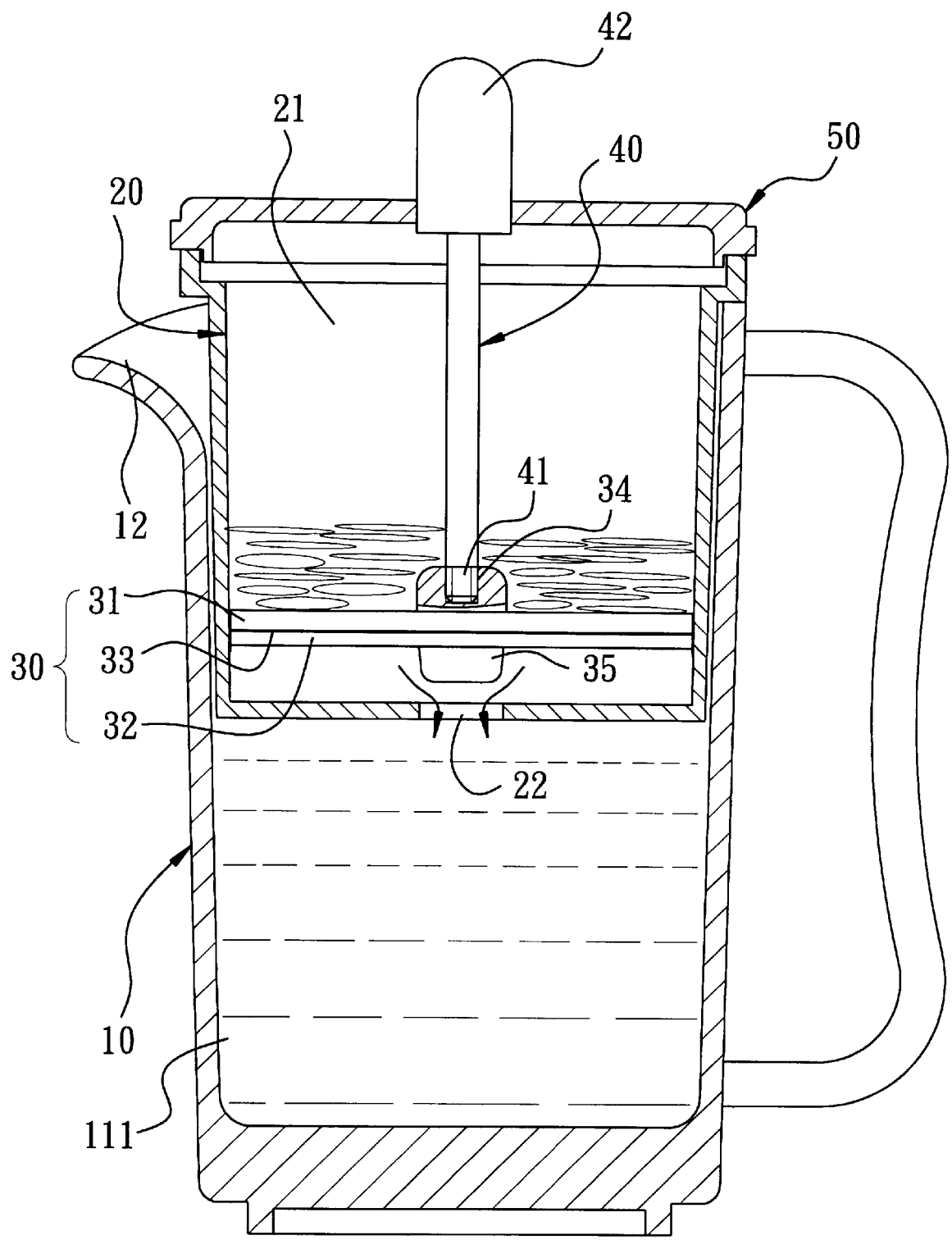
FIG. 4 is a sectional view of the infusing device when tea leaves are received therein for preparing a beverage.

In order to make a beverage, such as a tea drink, with reference to FIG. 3, the filter member 30 is moved near the bottom wall 24 of the infusing container 20 so that the plug member 35 is inserted into the outlet 22 to interrupt the fluid communication between accommodation spaces 21,110 of the infusing container 20 and the drinking vessel 10. A flavoring material, such as tea leaves, can be received in the infusing container 20 above the filter member 30, and liquid, such as hot water, is poured into the infusing container 20 for preparing a tea drink. Referring to FIG. 4, when the tea drink has been flavored sufficiently, the stem 40 is pulled upwardly to move the filter member 30 upward along with the plug member 35 so as to open the outlet 22 for discharging the tea drink into the accommodation space 110 of the drinking vessel 10. In addition, the filter member 30 can strain the water from the tea leaves. The tea drink can be poured out from the drinking vessel 10 via the lip 12.

When the stem 40 is pressed downward to move the filter member 30 and the plug member 35 downward back to the position shown in FIG. 3, the tea leaves retained in the infusing container 20 can be submerged once again by pouring hot water into the container 20. Thus, another tea drink can be made in the above manner.

As illustrated, since the tea drink which has been made in the infusing container 20 can be discharged into the drinking vessel 10 only by disengaging the plug member 35 from the outlet 22, and since the tea leaves are held by the filtering member 30, there is no need to pour the tea drink into an additional vessel, and the resulting tea drink can have a taste that suits the user. In addition, the tea leaves are submerged in a loose state in hot water, thereby flavoring the water in a short amount of time. The filtering member 30 is pulled upward for removal from the infusing container 20 along with the tea leaves, thereby resulting in convenient cleaning of the container 20.

Figure 5:
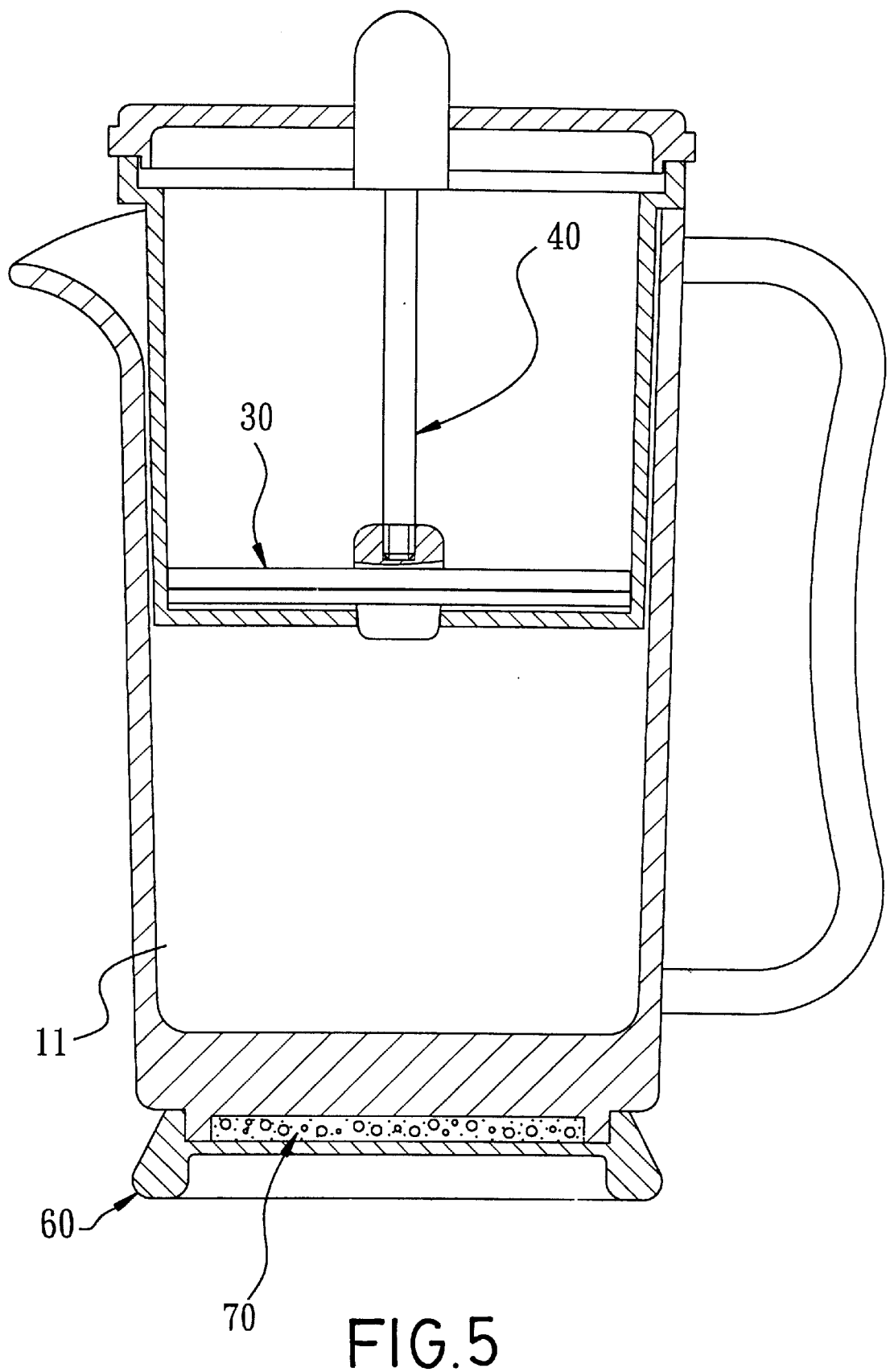
FIG. 5 is a sectional view of a second preferred embodiment of the infusing device according to this invention.

Referring to FIG. 5, a base seat 60 is mounted to the bottom of the drinking vessel 10, and is provided with a ceramic crystal 70 to emit far infra-red rays for activating the tea drink in the drinking vessel 10. The drinking vessel 10 can be replaced by an ordinary vessel, such as a teacup.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An infusing device for a beverage which is prepared by infusion of a flavoring material, said infusing device being adapted to discharge the beverage into a drinking vessel disposed thereunder, comprising:

an infusing container having an annular wall with a lower annular end and an upper annular end which defines a mouth that opens upwards in an axial direction, and a bottom wall extending inwardly and radially from said lower annular end to define an outlet therein that is adapted for discharging the beverage;

a filtering member insertable in said infusing container with a major surface transverse to said axial direction, said filtering member having a center area where an axis along said axial direction passes, and a perforated portion disposed offset from said center area, and adapted to permit the beverage to pass therethrough;

a stem fixed at said center area and extending outwardly of said mouth when said filtering member is inserted in said infusing container, said stem being adapted to be gripped by a user's hand; and a plug member disposed underneath said filtering member and registered with said outlet such that, when said filtering member moves with said stem in said axial direction, said plug member will engage and be disengaged from said outlet so as to close and open said outlet, respectively.

2. The infusing device as claimed in claim 1, wherein said outlet and said plug member are aligned along said axis.

3. The infusing device as claimed in claim 2, further comprising a lid having a center hole for passage of said stem, and a peripheral portion abutting against said upper annular end of said infusing container to cover said mouth.

* * * * *